United States Patent
Hall et al.

(10) Patent No.: US 9,802,663 B1
(45) Date of Patent: Oct. 31, 2017

(54) TAB-AND-SLOT FRAME MEMBERS WITH A STRINGER

(71) Applicants: David R. Hall, Provo, UT (US);
Stephen R. Hall, Draper, UT (US);
Christopher Johnson, Provo, UT (US)

(72) Inventors: David R. Hall, Provo, UT (US);
Stephen R. Hall, Draper, UT (US);
Christopher Johnson, Provo, UT (US)

(*) Notice: Subject to any disclaimer, the term of this patent is extended or adjusted under 35 U.S.C. 154(b) by 0 days.

(21) Appl. No.: 15/096,752

(22) Filed: Apr. 12, 2016

(51) Int. Cl.
| | | |
|---|---|---|
| *B62D 65/02* | (2006.01) | |
| *B63B 3/28* | (2006.01) | |
| *B64C 1/06* | (2006.01) | |
| *B64F 5/00* | (2017.01) | |
| *B62D 25/08* | (2006.01) | |
| *B62D 21/02* | (2006.01) | |
| *B23K 1/00* | (2006.01) | |
| *B23K 101/00* | (2006.01) | |

(52) U.S. Cl.
CPC ............... *B62D 65/02* (2013.01); *B23K 1/00* (2013.01); *B62D 21/02* (2013.01); *B62D 25/08* (2013.01); *B63B 3/28* (2013.01); *B64C 1/064* (2013.01); *B64F 5/0009* (2013.01); *B23K 2201/006* (2013.01); *Y10T 29/49622* (2015.01); *Y10T 29/49968* (2015.01)

(58) Field of Classification Search
CPC ........ Y10T 29/49622; Y10T 29/49968; B62D 65/02; B62D 65/00; B62D 21/02; B62D 25/08; B63B 3/28; B64F 5/0009; B64C 1/064; B23K 2201/006; B23K 1/00

USPC ........ 228/160, 162, 164, 170–172; 29/897.2, 29/525.14

See application file for complete search history.

(56) References Cited

U.S. PATENT DOCUMENTS

| | | | | |
|---|---|---|---|---|
| 4,097,716 A | * | 6/1978 | Reichelt, Jr. | B23K 33/004 219/137 R |
| 4,365,736 A | * | 12/1982 | Stumm | E04B 1/5806 228/121 |
| 6,434,907 B1 | * | 8/2002 | Simboli | B62D 21/09 296/146.6 |
| 7,413,240 B2 | * | 8/2008 | Rashidy | B60J 7/04 296/187.12 |
| 7,506,919 B2 | * | 3/2009 | Fayt | B60R 19/18 293/102 |
| 7,849,601 B2 | * | 12/2010 | Hedderly | B62D 23/00 29/429 |
| 8,911,005 B2 | * | 12/2014 | Townson | B62D 25/085 29/466 |
| 2006/0143892 A1 | * | 7/2006 | Shishikura | B62D 65/02 29/281.5 |

(Continued)

FOREIGN PATENT DOCUMENTS

FR  2987809 A1 * 1/2013 ............ B62D 65/02

*Primary Examiner* — Drew J Brown (57) ABSTRACT

A frame may comprise a plurality of interlocking tab-and-slot frame members forming a three-dimensional structure. A removable stringer may be designed into one or more of the interlocking tab-and-slot frame members. The stringers may be removed after positioning and welding of tab-and-slot frame members together. Notches may also be designed into and formed as additional features of a tab-and-slot frame member. Notches may serve as a guide for bending tab-and-slot frame members and in the creation of tabs and/or slots of the tab-and-slot frame members.

9 Claims, 10 Drawing Sheets

(56) References Cited

U.S. PATENT DOCUMENTS

| | | | | |
|---|---|---|---|---|
| 2008/0169680 A1* | 7/2008 | Hedderly | ............ | B62D 29/008 296/193.01 |
| 2012/0186438 A1* | 7/2012 | Frey | ........................ | F41A 23/52 89/37.01 |
| 2014/0192549 A1* | 7/2014 | Townson | ............ | B62D 25/085 362/548 |

* cited by examiner

TAB-AND-SLOT FRAME MEMBERS WITH A STRINGER

CROSS REFERENCE TO RELATED APPLICATIONS

This patent application is a continuation-in-part of U.S. patent application Ser. No. 14/662,712 filed Mar. 19, 2015, which claims priority to U.S. Provisional application No. 61/968,321 filed Mar. 20, 2014, both of which are incorporated herein by reference for all that they contain.

BACKGROUND OF THE INVENTION

The present invention relates generally to frames for vehicles such as automobiles, boats, airplanes, and the like. More specifically, the present invention relates to tab-and-slot frame member design features.

A vehicle frame, also known as a chassis, may provide a supporting structure for a vehicle. Such frames must typically be strong enough to withstanding the static and dynamic loads experienced by the vehicle. Elements that may apply loads to a vehicle may include the weight of the vehicle body itself plus any passengers and/or cargo. As a vehicle travels, it may also be subjected to torsional loads created by traveling over uneven surfaces, lateral loads created by steering the vehicle, torque created by the engine and transmission, longitudinal loads created by acceleration and breaking, and sudden impacts from collisions. In order to withstand such loads, vehicle frames are traditionally large, heavy, expensive and difficult to manufacture.

All other vehicle components such as lights, seats, upholstery, handles, radios, and speakers may be attached to the frame. Attachment has traditionally been accomplished by fasteners welded to the frame. This welding may increase the difficulty of manufacture as well as adding to the overall weight of the vehicle.

Various attempts have been made to reduce the cost and difficulty of manufacturing these large structural bodies. For example, U.S. Pat. App. No. 2008/0169680 to Hedderly describes a vehicle body assembly having a set of castings. Each member of the set of castings interlocks with another member of the set of castings to create a vehicle body structure. Another example is disclosed in U.S. Pat. No. 8,398,159 to Hall that describes a vehicle frame comprising a plurality of frame members including at least two side plate members interlocked with a bottom plate member and a vertically loaded plate member. The side plate members support the bottom plate member and the vertically loaded plate member through a plurality of tab and slot connections.

In view of the foregoing, what is needed are methods of designing and constructing of vehicle frames that will enable a vehicle frame to be customized during an initial build according to specific components or parts installed in the vehicle.

BRIEF SUMMARY OF THE INVENTION

This invention has been developed in response to the present state of the art and, in particular, in response to the problems and needs in the art that have not yet been fully solved by currently available systems and methods. Accordingly, improved systems and methods have been developed to design and construct custom vehicle frames. Features and advantages of different embodiments of the invention will become more fully apparent from the following description and appended claims, or may be learned by practice of the invention as set forth hereinafter.

Consistent with the foregoing, a method of constructing a custom vehicle frame with tab-and-slot frame members is disclosed. Such a method includes: cutting or stamping one or more generally flat sheets of metal into first and second tab-and-slot frame members; welding the first and second tab-and-slot frame members together; and cutting off a stringer attached to the first tab-and-slot frame member.

The first tab-and-slot frame member may have at least one stringer portion used to position and prevent warping of the tab-and-slot member when it is welded to another tab-and-slot frame member.

A body portion of a vehicle frame may comprise two or more interlocking tab-and-slot frame members forming a three-dimensional structure. A body portion of the frame may be formed from two or more interlocking tab-and-slot frame members. The two or more interlocking tab-and-slot frame members may comprise generally flat plates or bent plates. Such plates may be laser cut or stamped from larger plates. Such plates may also be formed of aluminum. Tab-and-slot frame members may be held together by a plurality of tab-and-slot connections which may further be welded in place. A tab-and-slot frame member is hereby defined as generally flat, thin member which connects to other tab-and-slot frame members, by way of tabs and slots, to form a three-dimensional structure. The connection between the tab-and-slot frame members is generally a tab or edge of the member which connects to another member by sliding into a slot or groove, or by recessing into a groove. The connection points of two or more tab-and-slot frame members may be welded or brazed together.

A portion of the tab-and-slot frame members may include a stringer. A stringer is a temporary support used to stabilize two sections of a tab-and-slot frame member while it is fitted to other tab-and-slot frame members. One or more stringers may be used on one or more tab-and-slot frame members. Stringers are especially needed where tab-and-slot frame members are prone to twisting due to weld heat or where exact positioning is need in frame construction. Stringers may be designed into the original build of a tab-and-slot frame member. This may be accomplished by designing stringer patterns into the original tab-and-slot design patterns. The design patterns may then be cut out or pressed out of a flat plate to form a tab-and-slot frame member with a stringer. Tab-and-slot frame members may be bent into various shapes and angles. A bending notch locating a bending position may be designed into a tab-and-slot frame member allowing the tab-and-slot frame member to be easily positioned to bend and easily bent. Tab-and-slot frame members, may have an attachment device disposed thereon. The attachment device may comprise a hole or several holes disposed in one or several of the plurality of interlocking tab-and-slot frame members forming a portion or a whole body of the frame. When several holes are present, they may be coaxial. The hole may comprise a threaded rivet secured therein formed of steel. The hole may also comprise a bolt secured therein.

A vehicle component such as a light, seat, handle, lock, wheel, motor, transmission, drive train, tractor implement, snow plow, weapon, tool, armor, or shock may be secured to one or more tab-and-slot frame members.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings.

DETAILED DESCRIPTION

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings.

Figure 1A:
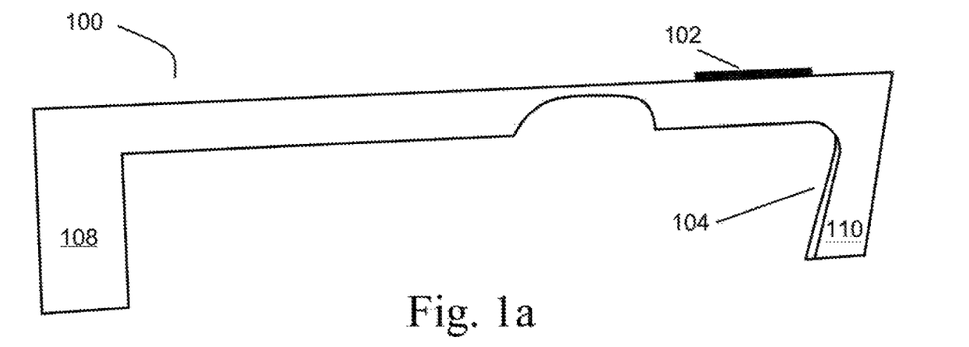
FIG. 1a thru 1c are front views of embodiments of tab-and-slot frame members in accordance with an embodiment of the present invention.
Figure 1B:
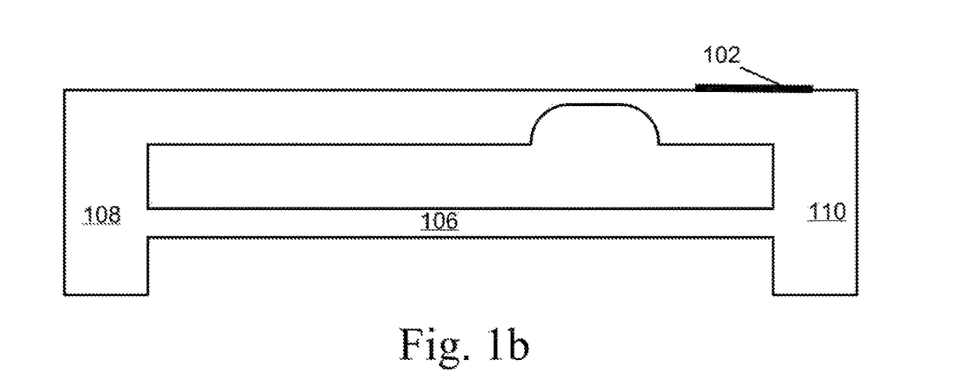
Figure 1C:
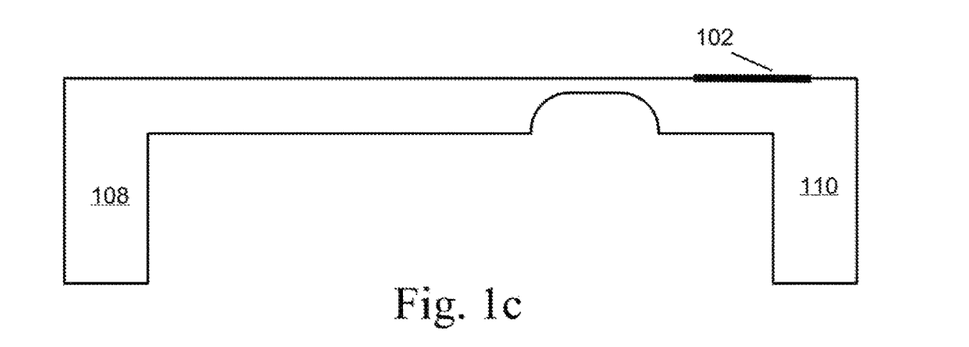

FIG. 1a, shows a twisted tab-and-slot frame member which has been welded 102 without a stringer 106. The two section 108 and 110 were not supported by a stringer while being welded 104 causing the warping and twisting 104. When a tab-and-slot frame member warps and twists because of heat it causes unwanted deviations and inconsistencies in frame design. FIG. 1b solves the problems of warping and twisting by providing a stringer portion 106 which temporarily connects sections 108 and 110 together for welding and poisoning purposes. After welding, stringer portion 106 may be removed as is shown in FIG. 1c. Multiple tab-and-slot frame members may be welded to the tab-and-slot frame member shown in FIG. 1b while preserving the original shape and spacing of sections 108 and 110. Welds may connect additional tab-and-slot frame members perpendicularly, parallel, or at an angle to a front, rear, or side face or edge of a tab-and-slot frame member. Without the stringer 106, each weld to another tab-and-slot member would cause a position deviation and additional warping of the tab-and-slot member sections 108 and 110. FIG. 1c shows a welded tab-and-slot frame member with the stringer removed. The tab-and-slot frame member of FIG. 1c held shape and position even after welding because of stringer 106 of FIG. 1b.

Figure 2A:
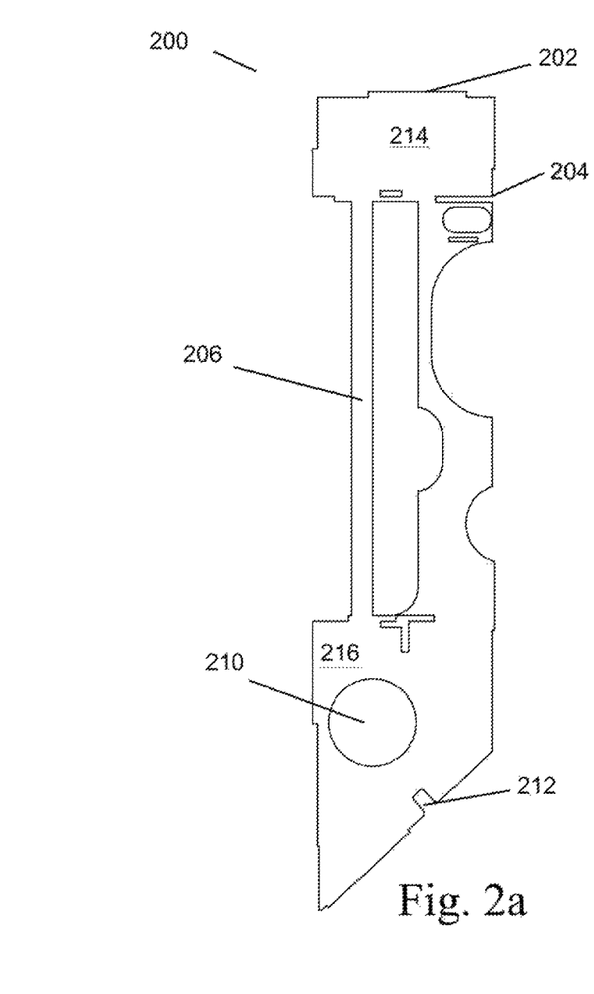
FIGS. 2a and 2b are front and perspective views respectively, of a tab-and-slot frame member in accordance with the invention.
Figure 2B:
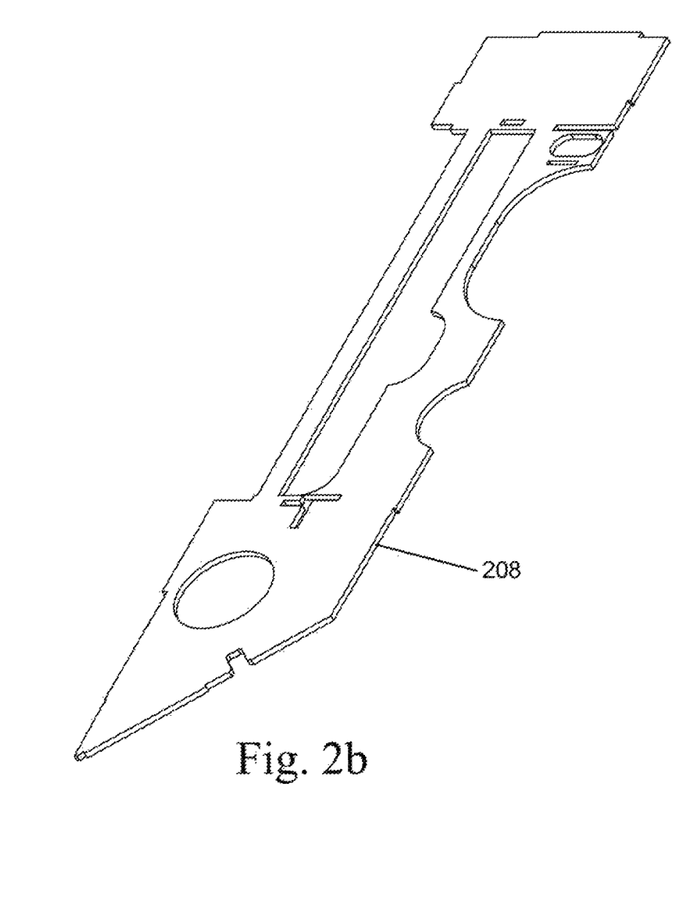

FIGS. 2a and 2b show a tab-and-slot frame member 200 with optional features. Hole 210 may be used to fasten on accessory components which are supported by a frame, the frame may be created by interlocking and welding tab-and-slot frame members together. The interlocking frame members may interlock and be welded at tab 202, slot 204, or slot 212. Stringer 206 may serve to support sections 214 and 216 while being welded to other tab-and-slot members. Stringers are especially useful when tab-and-slot frame members have thin or narrow features as shown in FIGS. 2a and 2b. A material thickness 208 may be in a range from 0.040 to 0.750 of an inch depending on the application of a frame created. For instance, a tank frame built from tab-and-slot members may have a tab-and-slot material thickness of 0.750 of an inch and a small airplane frame built from tab-and-slot members may have a material thickness of 0.040 of an inch. Other automobiles, motorcycles, trucks, and heavy equipment may have a material thickness in the range of 0.040 to 0.750 of an inch.

Figure 3:
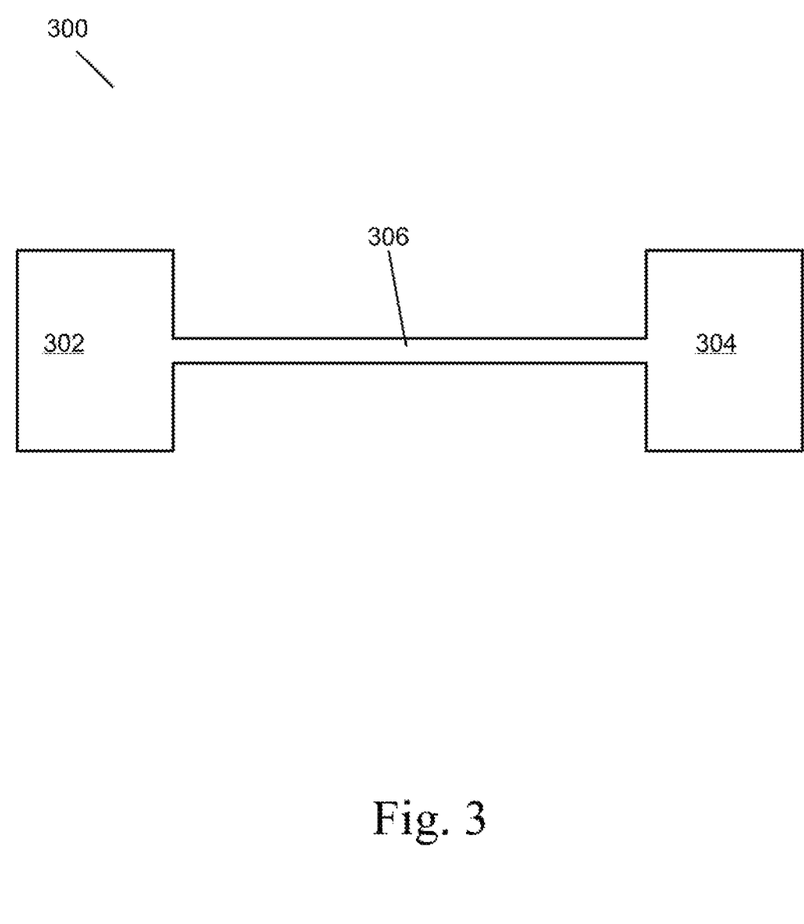
FIG. 3 is a front view of an embodiment of a tab-and-slot frame member in accordance with an embodiment of the invention.

FIG. 3 shows a top view of a simple tab-and-slot member 300 comprising two sections 302 and 304 connected by a stringer portion 306. Stringer portion 306 may provide a spacing between sections 302 and 304 which aid in the construction of a plurality of tab-and-slot frame members into a three-dimensional frame. Stringer portion 306 may also provide necessary rigidity while welding sections 302 and 304 to other tab-and-slot members to prevent twisting of sections 302 and 304. Stringer portion 306 may be removed after welding and/or positioning is complete.

Figure 4A:
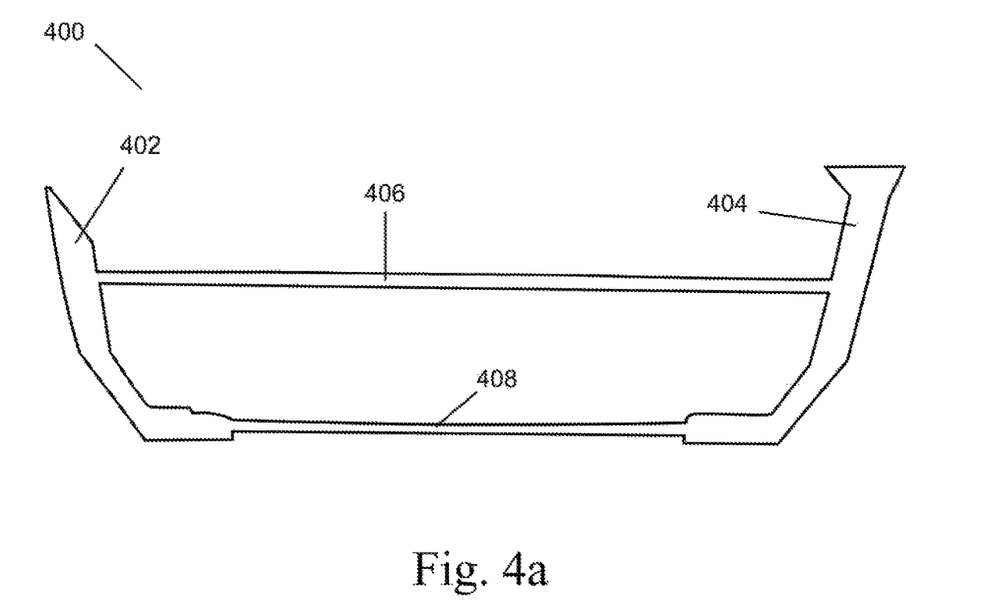
FIGS. 4a and 4b are front views of tab-and-slot frame members in accordance with an embodiment of the invention.
Figure 4B:
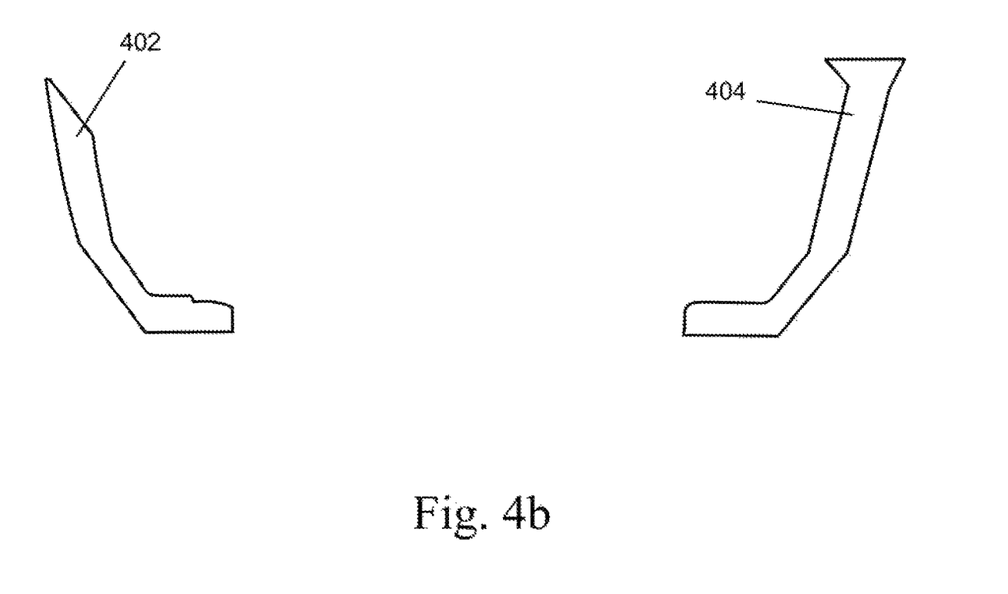

FIG. 4a shows a tab-and-slot frame member 400 with two stringer portions 406 and 408. Sections 402 and 404 are held in position while being weld to other tab-and-slot frame members. In FIG. 4b, stringer portions 406 and 408 have been removed.

Figure 5:
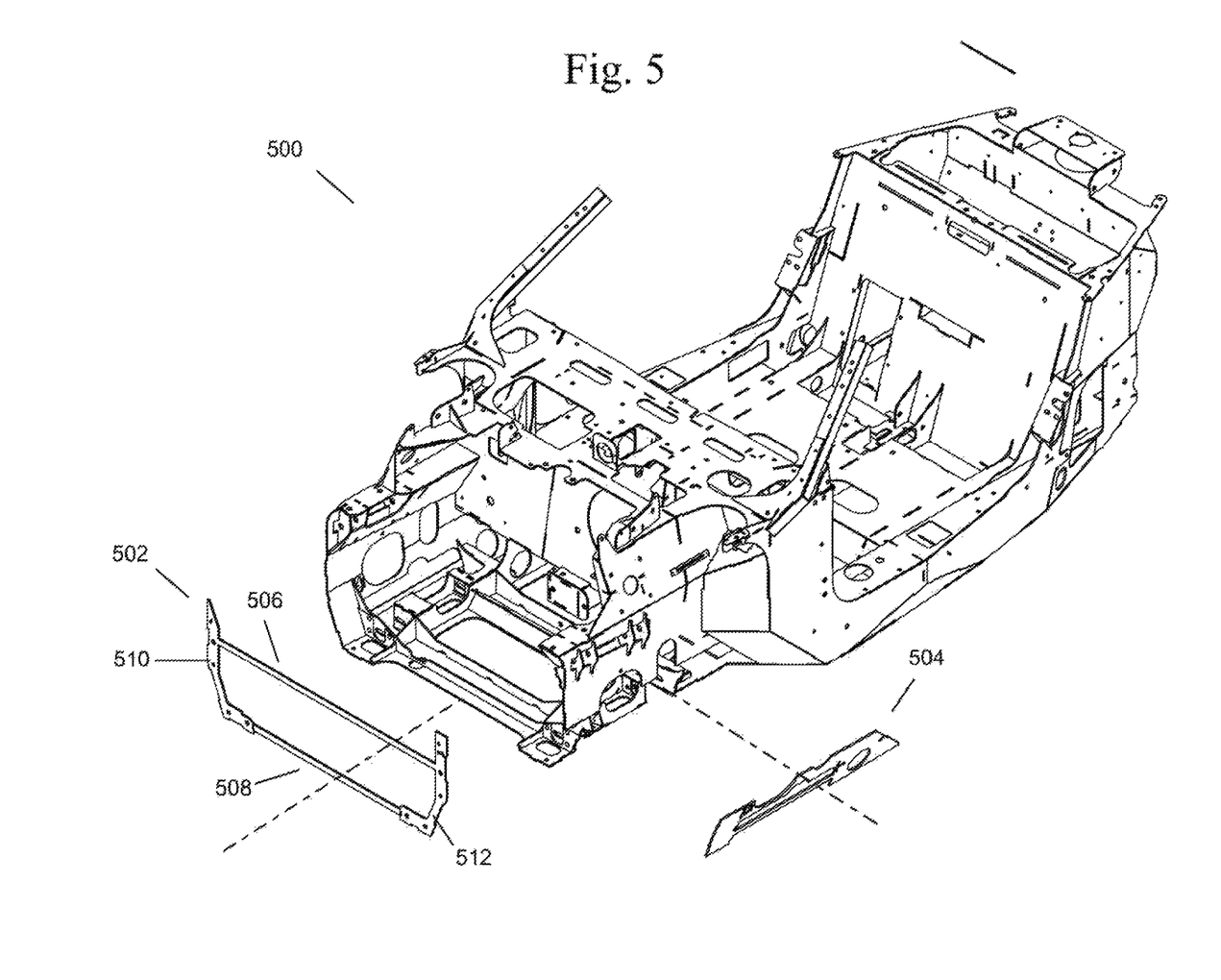
FIG. 5 is a perspective view showing attachment positions of tab-and-slot frame members to a vehicle body in accordance with an embodiment of the invention.

FIG. 5 shows a vehicle frame 500 comprising a plurality of interlocking tab-and-slot frame members forming a three-dimensional structure. The three-dimensional structure may be designed to support the vehicle's mechanical components and body while withstanding the static and dynamic loads experienced by the vehicle. These static and dynamic loads may include the weight of the vehicle body, passengers, and cargo loads; vertical and torsional twisting created by traveling over uneven surfaces; transverse lateral forces created by road conditions, side winds, and steering of the vehicle; torque created by the engine and transmission; longitudinal tensile forces created by acceleration and compression forces created by braking of the vehicle; and sudden impacts from collisions.

As can be seen, some of the plurality of interlocking tab-and-slot frame members may comprise generally flat plates while others may comprise bent plates. Such plates may be held together by a plurality of tab-and-slot connections. Such tab-and-slot connections may provide support to the three-dimensional structure as well as hold the three-dimensional structure together while it is being welded. By holding the three-dimensional structure together while it is being welded, the tab-and-slot connections may obviate a jig and lead to easier and less expensive manufacture. The tab-and-slot connections, along with the rest of the plates, may be formed by laser cutting or stamping the plates out from larger plates. Additionally, the plates may be formed of aluminum to minimize the weight of the vehicle. Certain tab-and-slot frame members such as 502 and 504 may comprise stringers 506 and 206 (of FIG. 2). These stringers may serve as a "designed in" positioning system allowing easy alignment and easy welding of sections 510 and 512 without additional alignment tools. FIG. 5 shows an unwelded view of tab-and-slot frame members.

Figure 6:
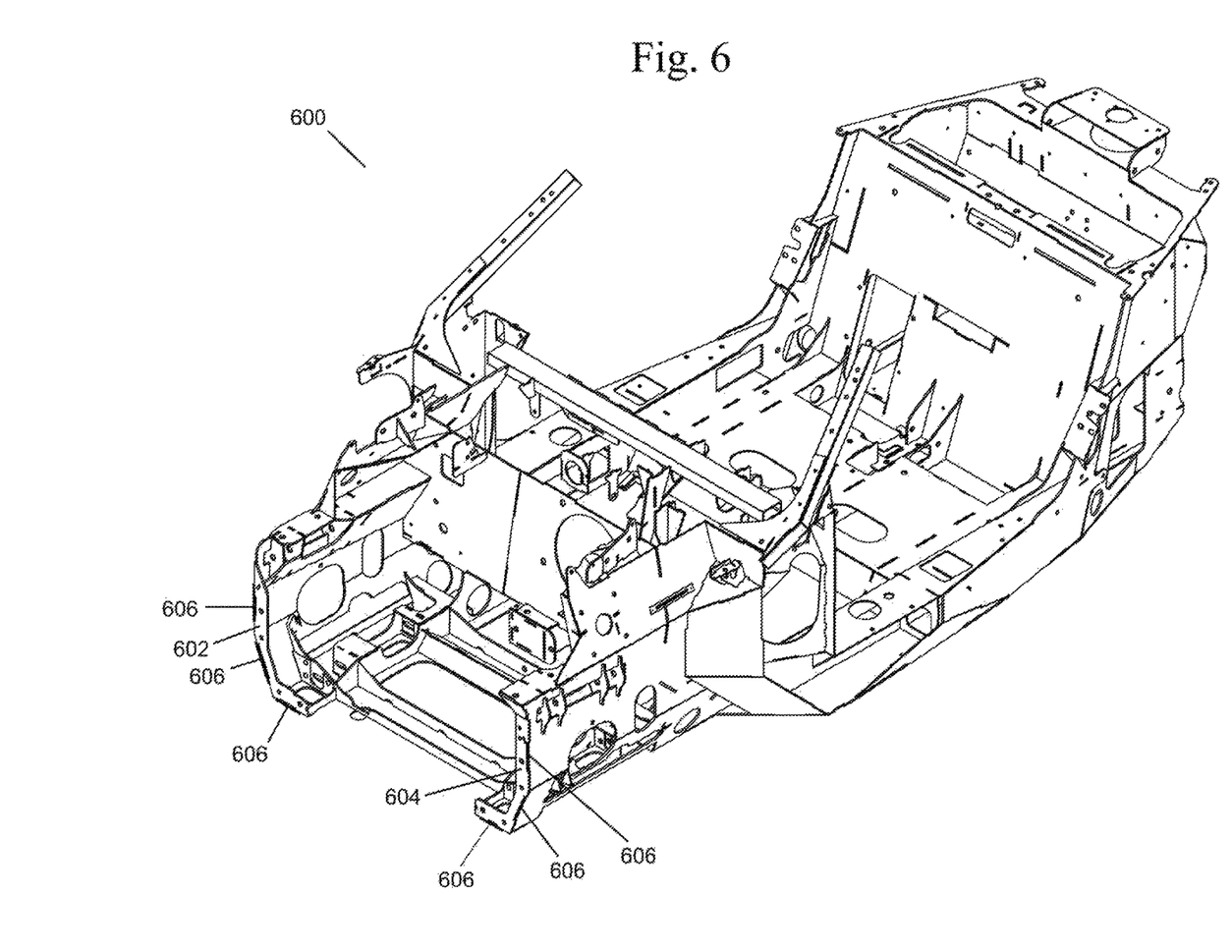
FIG. 6 is a perspective view showing attached tab-and-slot frame members to a vehicle body in accordance with an embodiment of the invention.
Figure 7A:
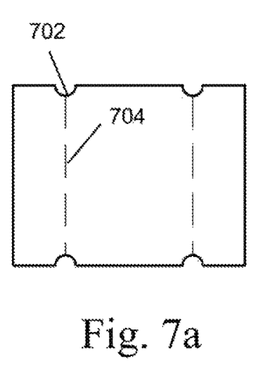
FIGS. 7a-7f are front views of optional features of tab-and-slot frame members is accordance with an embodiment of the invention.
Figure 7B:
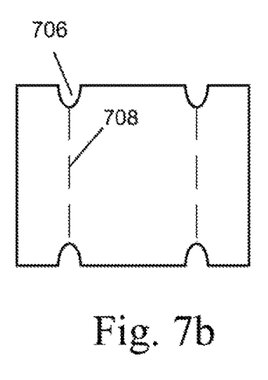
Figure 7C:
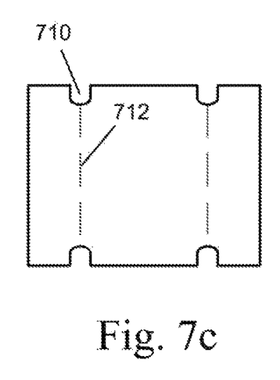
Figure 7D:
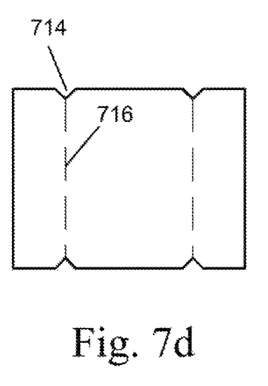
Figure 7E:
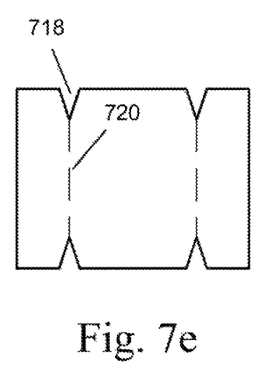
Figure 7F:
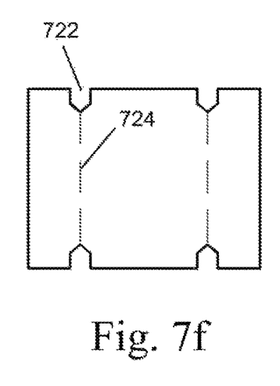

FIG. 6 shows a welded view of the tab-and-slot frame members of FIG. 5. The welded portions 606 connect sections 602 and 604 to other tab-and-slot frame members of a vehicle frame 600. The stringers shown in FIG. 5 have been removed after welding was complete.

FIGS. 7a-7f shows tab-and-slot optional design-in features. The shown design-in features may include notches 702, 706, 710, 714, 718, and 722 of various shapes and sizes which serve to provide a bending line 704, 708, 712, 716, 720, and 724. The notches provide position of a bend which is designed into a tab-and-slot frame member and a weakened bend line making a bend easier to make in a correct location.

Figure 8A:
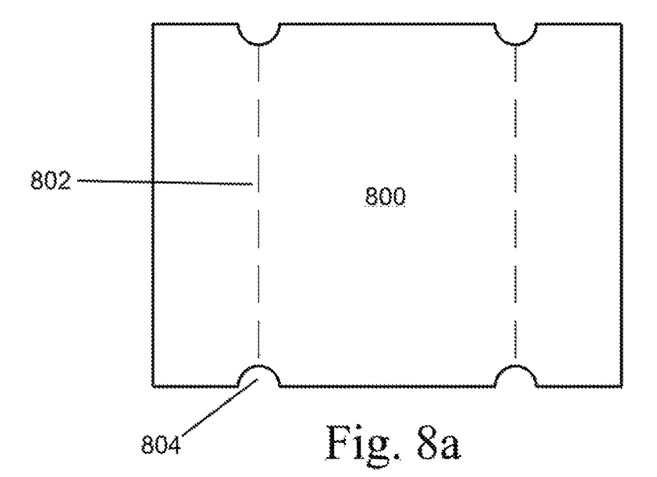
FIGS. 8a-8c are top, side and perspective views respectively, of optional features of tab-and-slot frame members is accordance with an embodiment of the invention.
Figure 8B:
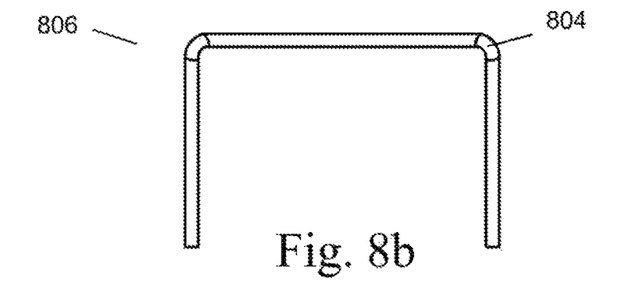
Figure 8C:
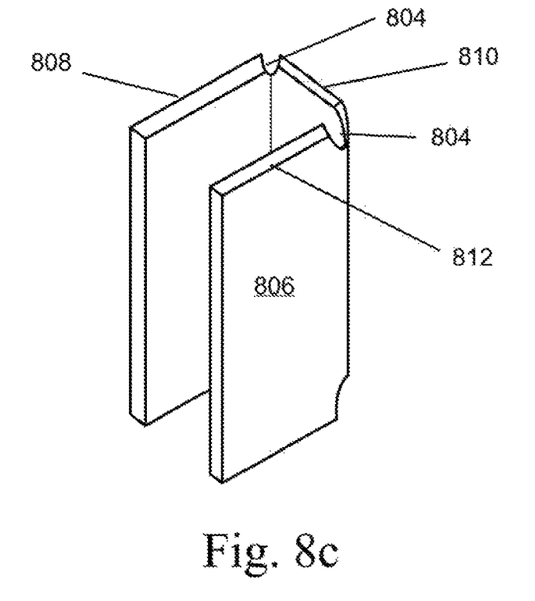

FIGS. 8a-8c shows notches 804 which were designed into a tab-and-slot frame member 800. FIG. 8a is shows a tab-and-slot frame member which has not been bent. FIGS. 8b and 8c show bent tab-and-slot frame members. It is of particular mention to note that tabs 808, 810, and 812, of tab-and-slot frame member 806, were formed as a result of notches 804 and being bent. Additionally, notches 804 of FIG. 8c may be used as a slot for receiving one or more tabs of another tab-and-slot frame member. The notches may serve a purpose of creating tabs and slots, creating bending location points, bending lines, and a weaker bending location in a correct location on a tab-and-slot frame member.

Figure 9A:
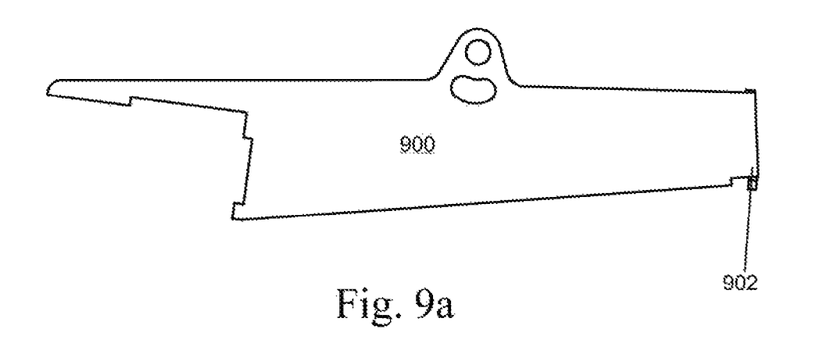
FIGS. 9a and 9b are top views of optional features of tab-and-slot frame members in accordance with an embodiment of the invention.
Figure 9B:
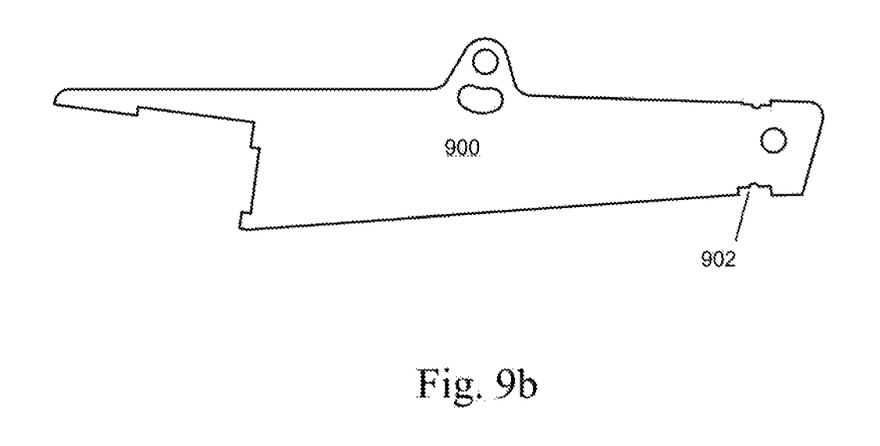

FIGS. 9a and 9b show a tab-and-slot frame member 900 before being bent 9b and after being bent 9a.

Figure 10:
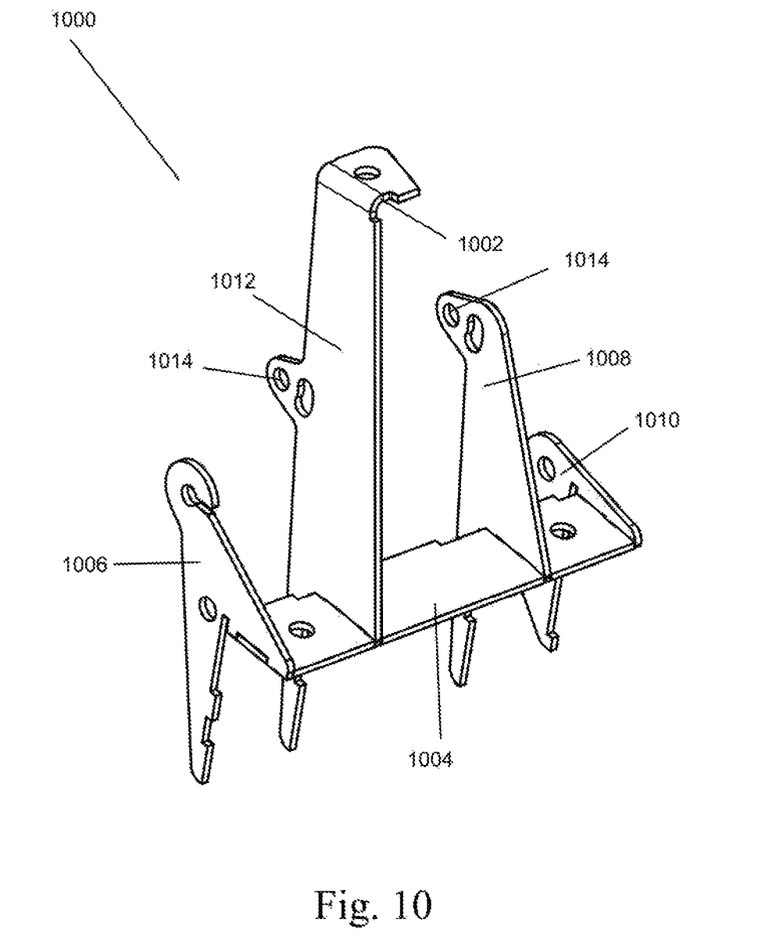
FIG. 10 is a perspective view of optional features of tab-and-slot frame member assembly is accordance with an embodiment of the invention.

FIG. 10 shows an example of an embodiment of a body of a frame 1000 created by interlocking tab-and-slot frame members to form the frame 1000. In this embodiment, two frame members 1012 and 1008 may be disposed parallel to each other and may each comprise a hole 1014 coaxial with the other. A component such as a control arm, may be secured to one or more tab-and-slot frame members of the frame 1000 as well as other tab-and-slot frame members 1006 and 1010.

The method disclosed herein may be embodied in other specific forms without departing from their spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A frame comprising:
    a first tab-and-slot-frame member with at least one removable stringer;
    a second tab-and-slot frame member; and
    a body portion of the frame comprising welds between the first tab-and-slot frame member to the second tab-and-slot member and the second tab-and-slot member, wherein the at least one removable stringer is removable after the two tab-and-slot sections are welded, and wherein the at least one removable stringer serves to hold in position the first tab-and-slot frame member when the two tab-and-slot sections are welded.

2. The frame of claim 1, wherein when the at least one removable stringer is removed before accessory components are attached to the frame.

3. The frame of claim 1, wherein the at least one removable stringer is removed before accessory components are attached to the frame.

4. The frame of claim 1, wherein the at least one removable stringer is more than 10 times longer in length than a material thickness of the first tab-and-slot frame member.

5. The frame of claim 1, wherein the frame is at least a portion of a vehicle frame.

6. The frame of claim 1, wherein the at least one removable stringer is integrally formed between two sections of the first tab-and-slot frame member.

7. The frame of claim 6, wherein the at least one removable stringer is removed, two tab-and-slot sections of the first tab-and-slot frame member are disconnected from each other.

8. The frame of claim 1, wherein the first tab-and-slot frame member and the second tab-and-slot frame member are made from generally flat sheets of metal which are laser cut or stamped on a press.

9. The method of claim 1 wherein the at least one removable stringer prevents warping of the first tab-and-slot frame member as the first and second tab-and-slot members are welded together.

* * * * *